J. M. WESTBROOK.
GIN SAW FILING MACHINE.
APPLICATION FILED MAR. 20, 1915.

1,173,906.

Patented Feb. 29, 1916.
6 SHEETS—SHEET 1.

UNITED STATES PATENT OFFICE.

JOHN M. WESTBROOK, OF ATLANTA, GEORGIA.

GIN-SAW-FILING MACHINE.

1,173,906.   Specification of Letters Patent.   Patented Feb. 29, 1916.

Application filed March 20, 1915. Serial No. 15,883.

*To all whom it may concern:*

Be it known that I, JOHN M. WESTBROOK, a citizen of the United States, residing at Atlanta, in the county of Fulton and State of Georgia, have invented new and useful Improvements in Gin-Saw-Filing Machines, of which the following is a specification.

This invention relates to improvements in gin saw filing machines, proposing a machine for sharpening the saws upon their mandrels or cylinders and of that type in which reciprocatory and rotary files are employed to sharpen and fashion the saw teeth.

The objects of the invention, briefly stated, are to provide a machine of the type identified which shall be relatively simple in its structural nature, organization, and mode of operation and wherein the operations of the various instrumentalities which act on the saws are reliably and positively effected in automatically controlled sequence; to provide a machine, as stated, which by means of a few adjustments of simple character may be readily adapted for saws of different diameter and spacing and for saw teeth of different form; to provide instrumentalities of such nature and relation that the saw teeth are not merely sharpened but are positively fashioned along definite outlines selected to insure of the ready removal of the lint from said teeth by the brushes or other means usually employed for the purpose, of the reliability and efficiency of the action of the saws upon the cotton and of a substantial increase in the capacity of the gin; and to provide for such operations of the saw filing instrumentalities and their appurtenances that the said instrumentalities reliably and certainly discharge their functions, notwithstanding deformations of the outlines of the said teeth, and moreover, effect not only the sharpening of the teeth but the elimination of any deformations thereof and the restoration of the teeth to their true and proper outlines.

With the above and other objects and advantages in view the invention consists in certain novel features, of structure, relation, and combination which will appear as the description proceeds.

An embodiment of the invention is illustrated in the accompanying drawings, wherein:—

Similar characters of reference designate corresponding parts throughout the several views.

The saw filing machine and the shaft of the gin saw mandrel or cylinder are both supported from a suitably constructed horizontal frame 1. The saw filing machine includes in its organization a lower horizontal frame 2 and an upper horizontal frame 3. The lower frame 2 is directly supported from the frame 1 and, in turn, is the direct support of the saw filing machine; and the upper frame 3 which carries the instrumentalities of the machine is supported from the frame 2.

When the files have completed their action upon certain of the saws, the saw mandrel or cylinder and the filing machine are moved relatively to one another transversely of the frame 1 and in order to permit of this transverse relative movement of these elements, the saw filing machine as an entirety must first be raised in order that its files may be clear of the saws mounted upon said mandrel or cylinder. Having this operation in view, the frame 2 is pivotally connected to frame 1 for movement in a vertical plane, The pivotal axis of the frame 2 comprises a stationary transverse rod 4 the ends of which are fitted in the side bars of the frame 1. The rod 4 passes through openings in the side bars of the frame 2, somewhat near the rear end of the latter. The frame 2 is provided with one or more screws 5 which may be frictionally engaged with the rod 4 to hold the frame 2 against loose play about said rod during the normal operation of the machine. When the machine is disposed in its normal operative position, the front end of the frame 2 is supported upon a transverse rest rod 6 carried by the frame 1. The side bars of the frame 2 are preferably provided with recesses or notches 7 which fit over the rest rod 6 in the normal position of the machine. When the machine and the gin saw cylinder or mandrel are to be moved transversely relatively to one another in order to present other saws to the instrumentalities of the machine, it is necessary, as above stated, to first move the machine so that its files are clear of the saws and for this purpose the screws 5 are loosened and thereupon the machine as an entirety is moved about the rod 4 as a pivotal axis, in such a manner that its front end, which carries the files is elevated to raise the files beyond the circumferences of the saws. Thereupon the machine is shifted transversely of the frame 1 until it is in suitable position for action upon the saws next following those which have been previously acted upon, after which said machine is lowered until its notches 7 engage the rest rod 6. The screws 5 are then tightened to hold the machine against play.

In order to adapt the machine for saws of different diameter and having teeth of different pitch, the frame 3 is mounted for movement relatively to the frame 2 and it may be adjusted as desired longitudinally and vertically of said frame. For these purposes, the support for the frame 3 comprises, in the embodiment disclosed, a pair of depending brackets 8 located adjacent the front of said frame and carrying trunnions 9 which engage upon the upper faces of the side bars of the frame 2; and a vertical screw stem 11 projecting through a longitudinal slot 12 in a horizontal web 13 at the rear end of the frame 2 and having its upper end threaded in a horizontal web 14 at the rear end of the frame 3. The screw stem 11 is used to effect vertical adjustments of the frame 3 relatively to the frame 2 and during such adjustment the frame 3 moves about the trunnions 9 as a pivotal axis. The screw stem 11 has its lower portion provided with threads 15 and above the threads 15 has a circumscribing flange 16 which engages upon the upper side of the web 13. By turning the stem 11, which for this purpose has a hand wheel 17 at its lower end, the frame 3 may be tilted in a vertical longitudinal plane relatively to the frame 2 whereby the mechanism at its front end may be set at any desired elevation within the range of adjustment provided for. The stem 11 is held against turning movement by a nut 18 mounted on the threads 15 and engaging under and against a lock bar 19 loosely mounted on the stem 11. The lock bar 19 has a central projection $19^a$ which fits within the slot 12 and its side portions $19^b$ engage against and under the web 13. Obviously, as the frame 3 is raised or lowered by turning the screw stem 11 the angle at which said stem projects through the slot 12 changes slightly and with this fact in mind those faces of the flange 16 and of the bar 19 which engage the web 13 are suitably rounded so that the engagement of said flange and said bar with the web 13 will be efficient in any angular position of the stem 11 relatively to the frame 2 through which said stem projects. The stem 11 preferably carries at its upper end a nut 20 which engages under and against the web 14. The engagement of the trunnions 9 upon the upper faces of the side bars of the frame 2 and the provision of the slot 12 permit of sliding movements of the frame 3 relatively to the frame 2. Such sliding adjustments of the frame 3 are effected manually in the embodiment disclosed. The frame 3 is normally held against accidental sliding movement by the clamping co-action of the flange 17 and lock bar 19 above mentioned and which engage the web 13 at opposite sides thereof. Obviously, before the frame 3 can be adjusted slidably relatively to the frame 2 it is necessary to slacken the nut 18 to thereby relieve the clamping pressure exerted by the flange 17 and the bar 19 upon the web 13.

The instrumentalities which act on the saws are a clamp 21 comprising a pair of clamping jaws 22; a rotary file or gummer 23; a pair of reciprocating files 24 and 25 which operate on the sides of the teeth; a pair of reciprocating files 26 and 27 which operate in the notches between the teeth; and a saw feeding mechanism 28 by which the saws are rotated in step-by-step fashion, each feeding movement of the saws corresponding to the interval of the teeth and taking place at the completion of the work of the filing instrumentalities upon particular teeth.

The operations of the instrumentalities above stated are simultaneous but as a matter of convenience these simultaneous operations are upon different saws. The arrangement preferred and shown is such that the clamp 21 and gummer 23 act on one saw, the files 24—27 act on another saw; and the feeding mechanism 24 acts on a plurality of saws. Each saw is first acted upon throughout its extent by the clamp and the gummer and thereafter, it is acted upon by the files 24—27.

Inasmuch as the spacing of the saws varies on different mandrels, it is necessary to provide for suitable adjustments of the instrumentalities in order to adapt the machine for variations of saw spacing. For this purpose, it is preferred to mount the gummer and the clamp upon a transversely adjustable element and to provide for like adjustments of the gummer and clamp operating means and of the saw feeding mechanism.

Figure 1:
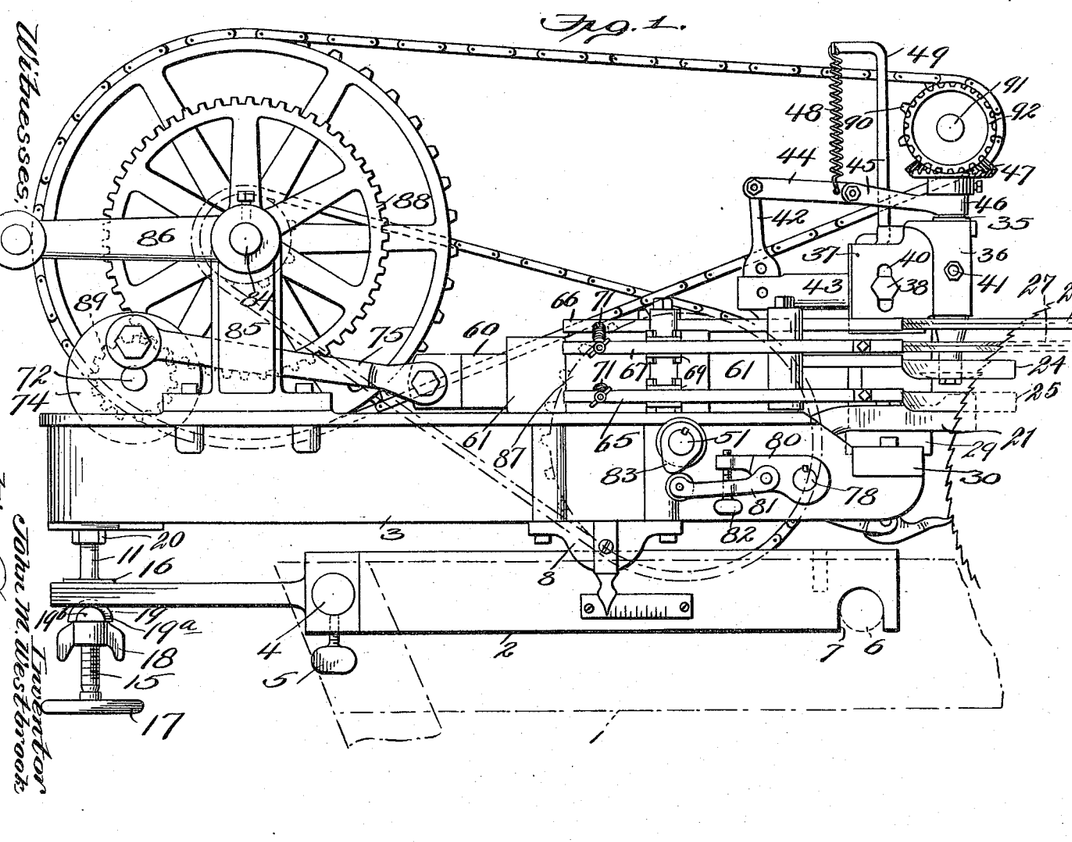
Figure 1 is a side elevation of a gin saw filing machine in which the features of the invention are incorporated.
Figure 2:
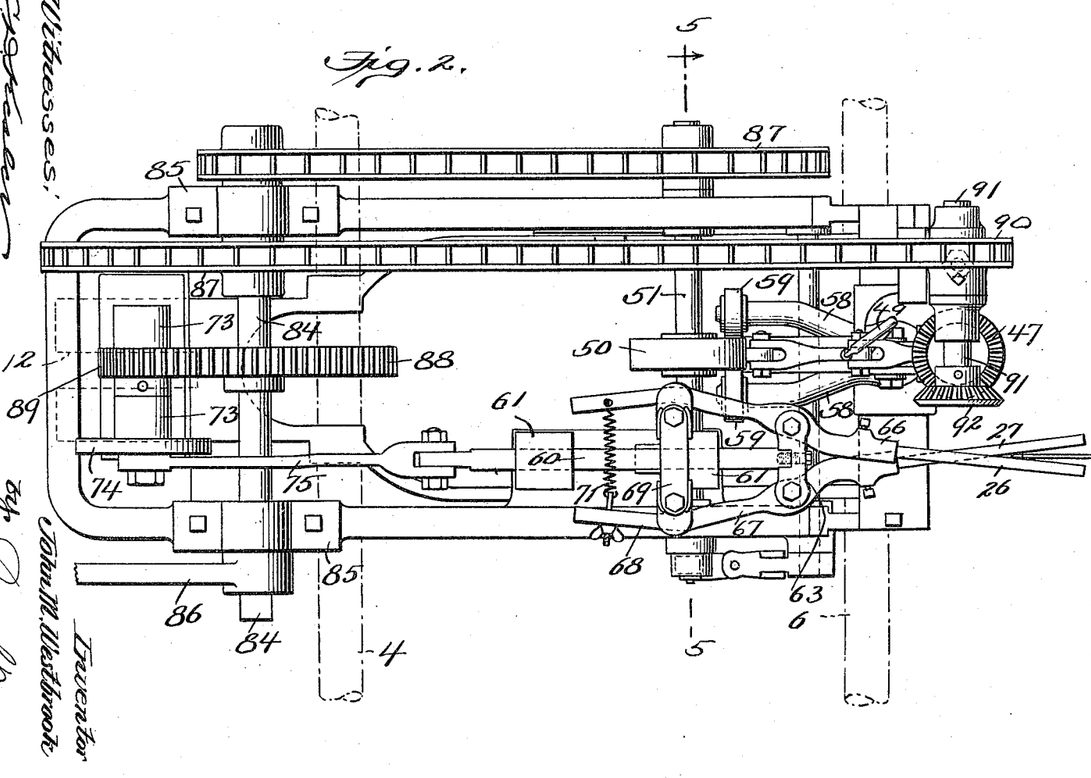
Fig. 2 is a plan view thereof.
Figures 3, 7:
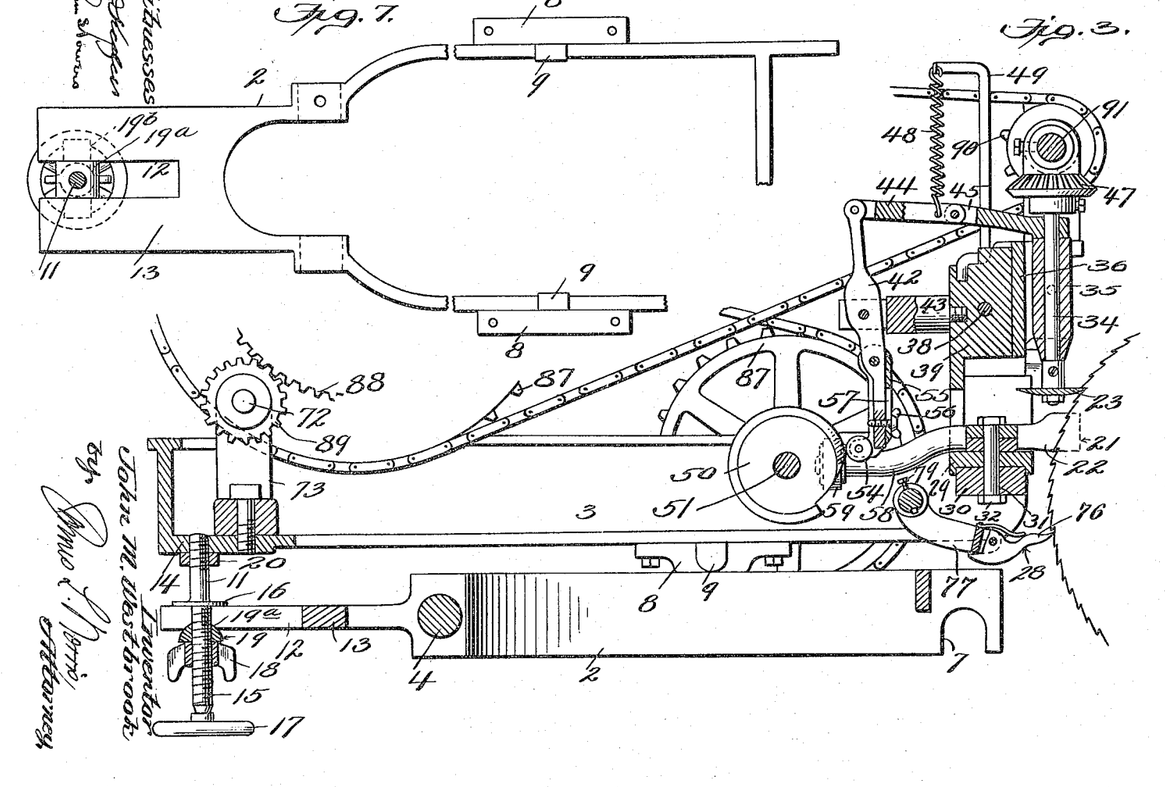
Fig. 3 is a central vertical longitudinal sectional view with parts omitted to promote clearness of illustration.
Fig. 7 is a detail plan view with parts shown in section of the lower frame of the machine.
Figures 4, 9, 10, 13:
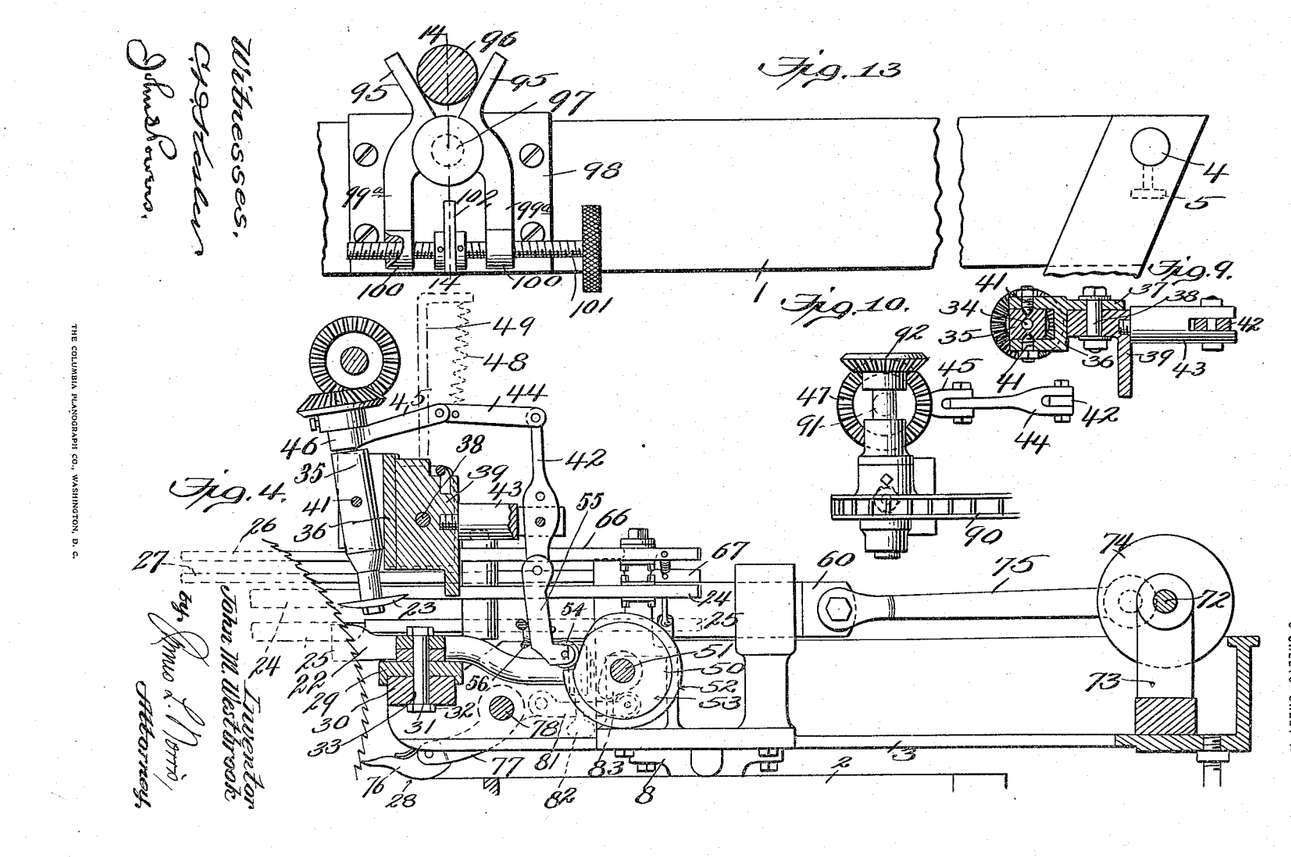
Fig. 4 is a detail longitudinal sectional view looking from the side of the machine opposite to that shown in Fig. 3 and showing a different operative relation of certain of the parts shown in Fig. 3.
Fig. 9 is a detail horizontal sectional view showing the organization of the gummer.
Fig. 10 is a detail plan view of one portion of the gearing for operating the gummer.
Fig. 13 is a side elevation of a frame which supports both the gin saw filing machine and the gin saws which are acted upon by said machine.
Figure 5:
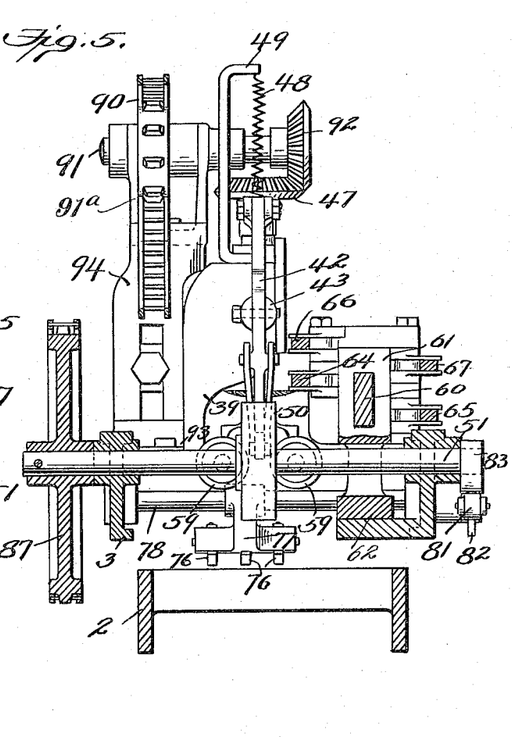
Fig. 5 is a detail cross sectional view on the line 5—5 of Fig. 2, looking in the direction of the arrow.
Figure 6:
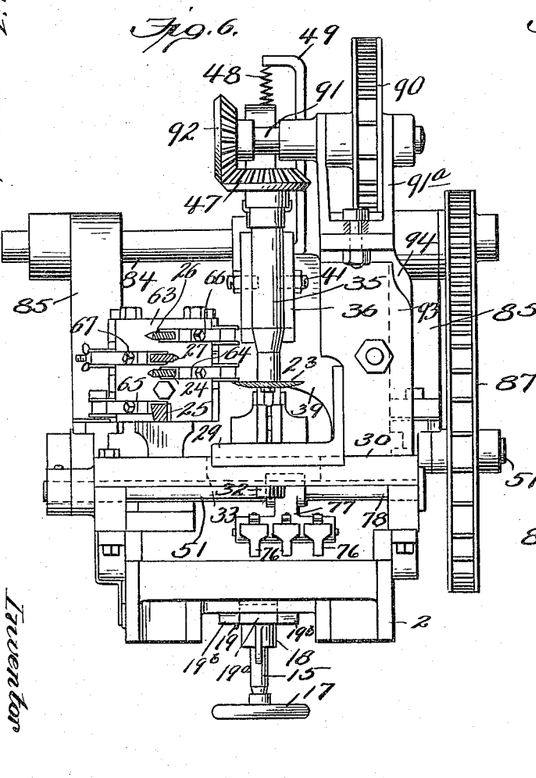
Fig. 6 is a front elevation with parts shown in section.
Figures 8, 11, 12, 14:
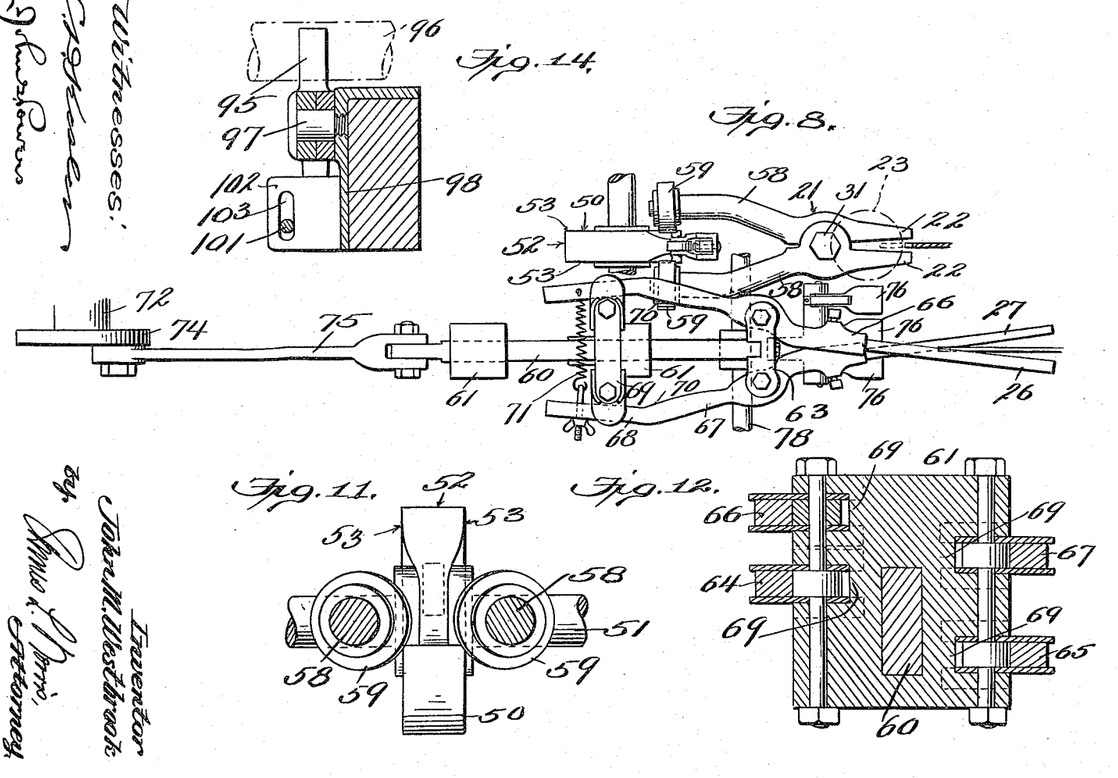
Fig. 8 is a detail plan view showing the relation of the saw clamp and the reciprocating files.
Fig. 11 is a detail sectional view showing the operating means for the saw clamp.
Fig. 12 is a cross sectional view showing the guide for the file carrying bars.
Fig. 14 is a detail sectional view on the line 14—14 of Fig. 13.

The adjustable element which carries the gummer 22 and the clamp 21 comprises a plate 29, (Fig. 4), extending transversely between the side bars of the frame 3 at the front thereof. The plate 29 is of somewhat less width than said frame in order that it may be adjusted transversely of the frame and rests upon a supporting cross bar 30. The plate 29 has an inverted channel shaped cross-section and fits over the bar 30 in order that it may be positively guided in its adjustment transversely of the frame 3. The plate 29 is held against movement by a bolt 31 having a nut 32 on its lower end which engages under and against the bar 30, the latter having a longitudinal slot 33 through which the bolt 31 passes.

The gummer 23 is mounted upon the lower end of a rotating vertical shaft 34 journaled in a bearing 35. The support for the bearing 35 comprises a bracket 36 having at its rear side a vertical attachment lug 37 secured by a bolt fastening 38 to an upright post or bracket 39 carried by the plate 29, the lug 37 having a vertical slot 40 through which the bolt of the fastening 38 extends and which permits of vertical adjustments of the bracket 36 relative to the post or bracket 39. The bearing 35 is mounted to oscillate in a vertical longitudinal plane of the machine and, as shown, its sides are provided with conical recesses in which fit the conical ends of retaining screws or pins 41 which provide the axis about which the bearing 35 oscillates.

The oscillation of the bearing 35 and therewith of the gummer shaft and gummer is produced by a lever 42 pivoted on an arm 43 projecting rearwardly from the post or bracket 39. The lever 42 oscillates in a vertical plane about its pivotal axis and rocks the bearing 35 through the intermediary of toggle links 44 and 45, the rear link 44 being connected to the upper end of the lever 42 and the front link 45 having at its outer end a collar 46 which surrounds the gummer shaft 34 and is arranged between the bearing 35 and a bevel pinion 47 forming an element of the gearing for rotating the gummer shaft. The links 44 and 45 are under the influence of a suitable spring. As shown, a retractile coil spring 48 is connected to the link 44 near the mutual pivot of the links, said spring hanging from the upper end of an arm 49 secured to the upright post or bracket 39. The bolt 31 which secures the plate 29 upon the cross bar 30 is also utilized as the common pivot of the jaws 22 of the clamp 21, which said jaws are periodically operated to exert clamping pressure on the saw which they engage. Where the clamp 21 and the gummer 23 act simultaneously upon the same saw, as in the embodiment disclosed, it is convenient to operate said clamp and gummer from a common element. The common element for operating the clamp and the gummer comprises a cam wheel 50 splined upon a transverse shaft 51 journaled in the side bars of the frame 3. The cam 50 has a circumferential cam face 52 which effects the oscillation of the lever 42 and lateral similarly formed cam faces 53 which effect the operation of the clamping jaws 22. The lever 42 is provided at its lower end with a friction roller 54 which engages the circumferential cam face 52. The roller 54 is not directly mounted upon the lever 42 but is mounted upon a shoe 55 which is pivoted near the lower end of the lever 42 for adjustment in a longitudinal plane of the machine and has its position relative to the lever 42 regulated by an adjusting screw 56 passing loosely through an opening 57 in the shoe 55 and threaded through the lever 42.

The jaws 22 of the clamp 21 have their saw engaging portions located in advance of their pivot 31 and in the rear of said pivot are provided with lever portions 58 which carry at their rear ends friction rollers 59 located in transverse planes and engaging the respectively adjacent lateral cam faces 53 of the wheel 50. The wheel 50 is adjustable lengthwise of the shaft 51 on which it is mounted in order that its position may be changed to accord with adjustments of the location of the plate 29 on the cross bar 30.

So long as the roller 54 is engaged by the raised portion of the cam face 52, the gummer 23 will be held in operative position, but when the roller 54 works in the depressed portion of the cam face 52, the gummer 23 will be moved rearwardly beyond the periphery of the saw upon which it is working. The depressed portions of the cam faces 53 coincide in location with the depressed portion of the cam face 52 from which it follows that the jaws 22 are operated to exert clamping pressure upon the saw during the period in which the gummer is in operative position but exert no clamping pressure upon the saw during the period in which the gummer is retracted.

The files 24—27 are operated by a reciprocatory bar 60 slidably mounted in alining bearings 61 having a common base 62 secured to an adjoining bar of the frame 3 by screws or otherwise. The bar 60 carries at its front end a head 63 which is preferably detachable from said bar. The files 24, 25, 26 and 27 are carried by arms 64, 65, 66 and 67, respectively. The arms 64 and 65 carrying the files 24 and 25 are pivotally mounted at opposite sides of the head 63, the plane of the arm 64 being above the plane of the arm 65; and the arms 66 and 67 carrying the files 26 and 27 are in like manner pivotally mounted at opposite sides of the head 63, the plane of the arm 66 being above the plane of the arm 67 and the plane of the arm 67 being above the plane of the arm 64.

The companion files work at opposite sides of the saw upon which they act; that is to say, the files 24 and 25 work at opposite sides of the saw and the files 26 and 27 in like manner work at opposite sides of the saw, the files 24 and 26 working at one side of the saw and the files 25 and 27 working at the opposite side of the saw. This relation is obtained by inclining the companion files relatively to one another along intersecting axes, and the angle of the companion files relatively to one another is determined and maintained by providing the arms 64—67 with lever portions 68 located in the rear of the fulcra of said arms and engaging fixed lateral extensions 69 of the foremost bearing 61, the extension 69 being preferably provided with anti-friction rollers. The lever portions 68 are provided near their forward ends and at their inner sides with cam projections 70 which at periods of the movement of the bar 60 engage the projections 69. At such times the projections 69 move the arms 64—70 about their pivots against the tension of springs 71, preferably retractile coil springs which connect the rear ends of the lever portions 68.

For the operation of the bar 60 a transverse shaft 72, located adjacent the rear end of the frame 3 and mounted in bearings 73, is provided, the shaft 72 having at one end thereof a crank arm or wheel 74 which is connected by a pitman 75 to the bar 60.

During the action of the gummer and the files, the saws are held against movement by the clamp 21, and at the completion of the action of the gummer and files, the clamping pressure of the clamp 21 is relieved in the manner above described to permit of a feeding movement of the saw. At such time the saw feeding instrumentality 28 comes into action. The saw feeding mechanism comprises a plurality of pawls 76 formed to engage the teeth of a similar number of adjoining saws and pivotally mounted at the outer end of an arm 77 which at its rear end is mounted upon a rock shaft 78, being held fast on said shaft by a screw or equivalent device 79. Upon slackening the screw 79, the arm 77 may be adjusted lengthwise of the shaft 78 as the exigencies of use may require. The rock shaft 78 is journaled in suitable bearings formed as parts of or secured to the frame 3 and is provided at one end thereof with a rearwardly projecting arm 80 which carries a pivotal finger 81 adjustable relatively to the arm 80 by a screw 82. The operation of the shaft 78 is produced by a cam 83 mounted on the shaft 51, previously referred to, and engaging the finger 81. The weight of the arm 77 and the pawls 76 is sufficient to hold the finger 81 in engagement with the circumferential surface of the cam 83. The normal position of the pawls 76 may be regulated as desired by the adjustment, through the agency of the screw 82, of the relative position of the arm 80 and the finger 81.

The power for the operation of the machine is furnished by a main shaft 84 journaled at a suitable elevation in bearings 85 arranged near the rear end of the frame 3. The shaft 84 may be operated manually or by power. As shown, it is provided at one end thereof with a crank handle 86. The cam shaft 51, the shaft 72 for operating the bar 60 of the reciprocatory filing mechanism, and the gummer shaft 34 are all driven from the shaft 84. A sprocket gear 87 is preferably employed as a means of operative connection between the shafts 84 and 51; a spur gear 88—89 is employed as a means of operative connection between the shafts 84 and 72; and a sprocket gear 90 is employed as a means of operative connection between the shaft 84 and a counter shaft 91 carrying at its inner end a bevel pinion 92 which meshes with the bevel pinion 47 secured on the upper end of the gummer shaft 34. The counter shaft 91 is journaled in a bearing 91ª which is secured at the upper end of a standard, in turn secured at one end of the cross bar 30. The said standard includes a fixed lower member 93 and an upper vertically adjustable member 94 to which the bearing 92 is directly secured and which may be raised or lowered to accord with the elevation at which the bearing 35 for the gummer shaft 34 is supported. The pinion 92 meshes with the pinion 47 and drives the gummer shaft throughout the period that the gummer is working upon a saw tooth; but when the bearing 35 is rocked to retract the gummer from the saw the pinion 47 on the gummer shaft is moved out of engagement with the pinion 92 and the rotation of the gummer shaft is thus interrupted during the period in which the gummer is retracted from the saw. When the bearing 35 is rocked to bring the gummer into operative relation to the saw, the pinion 47 is moved into mesh with the pinion 92 and the operation of the gummer is resumed immediately that the gummer is moved forwardly.

The gearing 87 is selected whereby several revolutions of the shaft 84 are required to produce one revolution of the cam shaft 51 and is thus a reducing gear. The gears 88, 89 and 90 are selected whereby one revolution of the shaft 84 will produce several revolutions of the respective shafts 72 and 34 and are thus multiplying gears.

As previously stated, the shaft of the gin saw mandrel or cylinder is supported by the frame 1. For the support of said shaft it is preferred to employ the means shown which comprises a pair of jaws 95 secured adjacent each side bar of the frame 1 and arranged to provide V-shaped seats for the ends of the cylinder or mandrel shaft 96. The jaws 95 are connected by a common pivot pin 97 to a supporting bracket 98 which is secured upon a side bar of the frame 1 and beyond their pivot 97 are provided with the lever portions 99ª which at their lower ends carry laterally projecting swiveled lugs 100. The lugs 100 are provided with threaded apertures which take upon the opposite threads of a right and left threaded operating screw 101 which has swiveled connections with a lug 102 formed as a part of the bracket 98, said lug having a vertical slot 103 which permits an upward and downward vertical movement of the screw 101 in accordance with the adjustments of the jaws 96. That is to say, if the screws 101 be operated to move the jaws 95 toward one another it will during its operation, move upwardly in the slot 103. On the other hand, if said screw be operated to move the jaws 95 away from one another, it will during such operation move downwardly in the slot 103. Obviously, the adjustment of the jaws 95 determines the elevation at which the shaft 96 is supported, the elevation of said shaft being higher as the jaws 95 are adjusted toward one another and being lower as said jaws are adjusted away from one another.

The operation of the machine is as follows: The gin saw cylinder is placed upon the table 1, its shaft 96 resting upon the supports 95 and the various instrumentalities are adjusted in the ways described in accordance with the diameter and spacing of the saws and the pitch of their teeth. The construction shown in the drawings assumes that the work progresses from the right to the left end of the cylinder; that is to say, the machine commences its work upon the saws at the right end of the cylinder and the saws are successively sharpened in the order of their arrangement from right to left. Each saw is acted upon by the clamp 21, the gummer 23, the files 24 and 25 and the files 26 and 27 in the order named. The clamp and gummer act simultaneously upon one saw and the files 24—27 act simultaneously with one another and with the clamp and gummer upon another saw. At a period in each revolution of the shaft 51 and when the clamp, gummer and files are inoperatively disposed, the saw feeding mechanism automatically comes into action and advances the saws about the cylinder shaft as an axis through a distance corresponding to the interval of the teeth. When the work upon particular saws has been completed, the machine and the gin saw cylinder are relatively shifted, by a transverse movement of the machine to present the saws next in order to the instrumentalities of the machine.

The office of the clamp 21 is two-fold; viz. it holds the saws against movement during the operation of the filing instrumentalities and it restores or reforms into the plane of the saw any teeth which may have become bent in a lateral direction consequent to engagement with obstructions in the cotton. The clamp 21 thus in addition to its primary or clamping function prepares each tooth of the saw for the subsequent action of the filing instrumentalities.

The office of the gummer 23 is to file the cutting; or more strictly the pulling edge of each tooth. It will be observed that the lever 42 is acted upon by the cam 50 to produce a slow but positive feed of the gummer along the cutting edge of each tooth from the point to the base thereof. During this operative oscillatory movement of the gummer, the cutting edge of each tooth is straightened and formed along a line best calculated to secure an efficient action of the saw. The gummer, being under the control of the lever 42, cannot exceed the fixed limit of its movement toward the base of the tooth but on the other hand, being operated slowly but positively by the cam 50, its operative oscillatory movement cannot be defeated or retarded by surface irregularities or deformations which it may encounter. The operation of the gummer is thus certain and reliable, and all of the teeth are cut to a uniform depth and with a uniform outline.

The cam face 52 which produces the oscillatory movement of the gummer has an abrupt drop from its highest to its lowest point and the cam faces 53 which control the clamping jaws 22 have similar drops coincident with the drop of the face 21. It follows that the gummer is quickly retracted from between the teeth and that the jaws 21 are as quickly disengaged from the saw. It is at this point of the action of the shaft 51 that the saw feeding mechanism becomes operative in the manner explained.

The files 24 and 25 work upon the sides of the teeth and their office is to give the teeth the requisite taper from their bases to their points and from their upper edges to their lower edges. In connection with the operation of the files 24 and 25 it is to be observed that they produce a sort of a knife edge at the point of the tooth, points of this character having greater strength and better operative qualities than the ordinary needle points and being more readily and thoroughly cleaned of lint by the brushes or pneumatic agencies ordinarily employed.

The office of the files 26 and 27 is to remove the bur produced by the gummer and the files 24 and 25 and thus to give the teeth the "finish" requisite for the satisfactory operation thereof.

Inasmuch as the speed of the shaft 51 is reduced relatively to the speed of the main shaft 84 and the speed of the shafts 34 and 72 is increased relatively to the speed of the main shaft 84, it follows that the gummer and files will have a relatively large number of revolutions and strokes during every revolution of the shaft 51, amply sufficient to insure of the satisfactory truing and sharpening of each tooth.

The files 24—27 when in engagement with the teeth have a measure of clamping effect on the saw upon which they work and in this respect supplement to some extent the action of the clamp 21.

Upon each rearward stroke of the bar 60, the files are disengaged from the saw by the coaction of the projections 70 and 69 which effect the spreading of the lever portions 68 of the file carriers 64—67. This periodical disengagement of the files from the saw promotes the efficiency of the action of the files. One of the periods of the disengagement of the files from the saw coincides with the period during which the gummer is retracted and the clamp 21 is disengaged in order that the files may oppose no resistance to the movement of the saws by the feeding instrumentality 28.

Saws which are filed by the present machine do not in any way injure the cotton upon which they act, discharge their functions with marked efficiency and increase the output of the gin, are not particularly liable to deformation or breakage, and are readily cleaned by the agencies usually employed.

It will be understood that no specific description herein contained is intended to put any limitations upon the scope of the appended claims which do not inhere in the language thereof.

Having fully described my invention, I claim:

1. In a gin saw filing machine, a rotary gummer, a pair of reciprocatory flat files arranged to act on the opposite sides of the teeth and to act on each tooth subsequent to the action of the gummer thereon, and another pair of reciprocatory files working at opposite sides of each saw and arranged to act on each tooth in the notches between the same and an adjoining tooth subsequent to the action of the flat files thereon.

2. In a gin saw filing machine, a rotary gummer, a pair of reciprocatory flat files arranged to act on the opposite sides of the teeth and to act on each tooth subsequent to the action of the gummer thereon, another pair of reciprocatory files working at opposite sides of each saw and arranged to act on each tooth in the notch between the same and an adjoining tooth subsequent to the action of the flat files thereon, and a clamp arranged to act on each saw at opposite sides of each tooth thereof in advance of the action of the gummer thereon.

3. In a gin saw filing machine, a pair of reciprocatory flat files arranged to act on the opposite sides of the teeth and another pair of reciprocatory files working at opposite sides of the saw and arranged to act on each tooth in the notch between the same and an adjoining tooth subsequent to the action of the flat files thereon.

4. In a gin saw filing machine, a rotary gummer, a saw clamp including clamping jaws arranged to act on each tooth of a saw in advance of the action of the gummer thereon, a movable supporting means for the gummer, and cam controlled means for producing an operation of said clamping jaws and a simultaneous movement of the gummer supporting means to advance the gummer toward the base of the tooth upon which it operates.

5. In a gin saw filing machine, a rotary gummer, a vertical shaft carrying the gummer, an oscillatory bearing for the shaft, a spring held oscillatory lever for oscillating said bearing and a cam for effecting a positive movement of said lever against the tension of its spring and in a direction to produce an operative advance of said gummer.

6. In a gin saw filing machine, a rotary gummer, a saw clamp, a movable supporting means for the gummer and cam controlled means for producing an operation of said clamp and a simultaneous movement of the gummer supporting means to advance the gummer toward the base of the tooth upon which it operates.

7. In a gin saw filing machine, a rotary gummer, a saw clamp including clamping members arranged to operate at opposite sides of a saw, an oscillatory support for the gummer, an oscillatory spring held lever for oscillating said support, and a rotary cam having a cam face for engagement with said lever and having other cam faces for engagement with said clamping jaws.

8. In a gin saw filing machine, a rotary gummer, a saw clamp including clamping members arranged to operate at opposite sides of the same saw upon which the gummer operates, an oscillatory support for the gummer, an oscillatory spring held lever for oscillating said support and a rotary cam arranged between said clamping members and having lateral cam faces acting thereon and a circumferential cam face acting on said lever.

9. In a gin saw filing machine, a rotary gummer, a saw clamp including pivoted clamping members arranged to operate at opposite sides of the same saw upon which the gummer operates, a shaft for the gummer, a supporting bracket for the gummer shaft, a cross bar, the bracket having a base plate which fits upon said cross bar, and a bolt for securing said base and clamping jaws upon said bar, the bolt forming the pivotal axis of said jaws.

10. In a gin saw filing machine, a rotary gummer, a saw clamp including clamping members arranged to operate at opposite sides of the same saw upon which the gummer operates, a gummer shaft, an oscillatory bearing for the gummer shaft, a bracket supporting said bearing, an oscillatory spring held lever for oscillating said bearing, a transverse rotary shaft, a cam slidably adjustable on said transverse shaft, the cam being arranged between said clamping members and having lateral cam faces acting thereon and a circumferential cam face acting on said lever and a transversely adjustable plate to which said bracket and clamp are secured.

11. In a gin saw filing machine, a rotary gummer, a saw clamp including pivoted clamping members arranged to operate at opposite sides of the same saw upon which the gummer operates, a gummer shaft, an oscillatory bearing for the gummer shaft, a bracket supporting said bearing, an oscillatory spring held lever for oscillating said bearing, a transverse rotary shaft, a cam slidably adjustable on said transverse shaft, the cam being arranged between said clamping members and having lateral cam faces acting thereon and a circumferential cam face acting on said lever, a cross bar, and a screw for securing said bracket and clamp to said bar and forming the pivotal axis of said clamping jaws.

12. In a gin saw filing machine, a pair of reciprocatory files arranged to work at opposite sides of a saw, a reciprocatory file bar, bearings through which the file bar slides, spring held arms carrying said files and pivotally mounted on said file bar, one of the bearings having lateral extensions, and cam projections provided on said arms to engage said extensions at a period of the movement of the file bar whereby the arms are spread against the tension of their springs.

13. In a gin saw filing machine, saw filing instrumentalities and their appurtenances, a frame by which said instrumentalities are carried, a supporting frame to which said first named frame is connected for vertical pivotal and longitudinal sliding adjustments, and means co-acting with said last named frame for effecting vertical adjustments of said first named frame.

14. In a gin saw filing machine, a rotary gummer, an oscillatory support therefor, means for oscillating said support, a saw clamp including a pair of clamping jaws, means for spreading said jaws at the time the gummer is retracted from the saw, a saw feeding mechanism and means for operating the saw feeding mechanism at the time the gummer is retracted from the saw and the clamping jaws are spread.

15. In a gin saw filing machine, a rotary gummer, an oscillatory support therefor, an oscillatory lever for oscillating said support, a saw clamp including a pair of clamping jaws, a saw feeding mechanism, a cam shaft, cam means on said shaft for controlling the oscillations of said lever and said clamping jaws and a cam on said shaft for operating said saw feeding mechanism at a period when the gummer is retracted and the clamping jaws are disengaged from the saw.

16. In a gin saw filing machine, a saw clamp, saw filing instrumentalities, a saw feeding mechanism, means for periodically and simultaneously disengaging said filing instrumentalities and said clamp from the saw and means for operating said saw feeding mechanism during the periods of disengagement of said filing instrumentalities and clamp.

17. In a gin saw filing machine, saw filing instrumentalities, and a saw clamp including clamping jaws arranged to engage the said teeth prior to the action thereon of said instrumentalities, the said jaws being formed to straighten said teeth.

18. In a gin saw filing machine, saw filing instrumentalities, a saw clamp including clamping jaws arranged to engage the saw teeth prior to the action thereon of said instrumentalities, means for operating said instrumentalities and means for operating said clamp simultaneously with the operation of said instrumentalities.

19. In a gin saw filing machine, saw filing instrumentalities, a saw clamp including clamping jaws arranged to engage the saw teeth, means for operating the clamp and for periodically disengaging the same from the saw teeth, means for periodically rendering the saw filing instrumentalities inoperative with respect to the saw and at the times when said clamping jaws are disengaged, a saw feeding mechanism, and means for operating the saw feeding mechanism during the periods in which the filing instrumentalities and the clamp are inoperative.

20. In a gin saw filing machine, a main shaft, a cam shaft, reducing gearing between the main shaft and the cam shaft, a rotary gummer, a saw feeding mechanism, multiplying gearing between the main shaft and the gummer, an oscillatory support for the gummer, an oscillatory lever for oscillating said support, a cam on the cam shaft for oscillating the lever and thereby projecting or retracting the gummer relatively to the saw and a second cam on the cam shaft for operating the saw feeding mechanism and arranged to act thereon during the periods in which the gummer is retracted.

21. In a gin saw filing machine, a main shaft, a cam shaft, reducing gearing between the main shaft and the cam shaft, a rotary gummer, a saw clamp including movable clamping jaws, a saw feeding mechanism, an oscillatory support for the gummer, an oscillatory lever for oscillating said support, cam means on the cam shaft for oscillating the lever and thereby projecting or retracting the gummer relatively to the saw and for spreading said jaws simultaneously with the retraction of said gummer, and a cam on the cam shaft for operating the saw feeding mechanism and arranged to act thereon during the period in which the gummer is retracted and the clamping jaws are spread.

22. In a gin saw filing machine, a supporting means for the gin saw mandrel or cylinder carrying the saws to be sharpened and providing seats for the shaft of said mandrel or cylinder comprising in each instance a pair of diverging pivotally mounted shaft engaging jaws having lever portions beyond their pivots and an adjusting connection between said lever portions.

23. In a gin saw filing machine, a rotary gummer, a gummer shaft, an oscillatory bearing for the gummer shaft, a bracket supporting said bearing, an oscillatory spring held lever for oscillating said bearing, said bracket also supporting said lever, a transversely adjustable cam acting on said lever, a frame for the machine including a fixed cross bar, and a connection for securing said bracket to said cross bar and operative to permit a transverse adjustment of said bracket.

In testimony whereof I have hereunto set my hand in presence of two subscribing witnesses.

JOHN M. WESTBROOK.

Witnesses:
  G. W. PIERCE,
  D. L. CARMICHAEL.

Copies of this patent may be obtained for five cents each, by addressing the "Commissioner of Patents, Washington, D. C."